United States Patent
He et al.

(10) Patent No.: US 12,314,596 B2
(45) Date of Patent: May 27, 2025

(54) END-TO-END DATA PLANE OFFLOADING FOR DISTRIBUTED STORAGE USING PROTOCOL HARDWARE AND PISA DEVICES

(71) Applicant: Intel Corporation, Santa Clara, CA (US)

(72) Inventors: Shaopeng He, Shanghai (CN); Yadong Li, Portland, OR (US); Ziye Yang, Shanghai (CN); Changpeng Liu, Shanghai (CN); Haitao Kang, Shanghai (CN); Cunming Liang, Shanghai (CN); Gang Cao, Shanghai (CN); Scott Peterson, Beaverton, OR (US); Sujoy Sen, Beaverton, OR (US); Yi Zou, Portland, OR (US); Arun Raghunath, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 17/092,640

(22) Filed: Nov. 9, 2020

(65) Prior Publication Data

US 2021/0103403 A1    Apr. 8, 2021

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
None
See application file for complete search history.

(56) References Cited

U.S. PATENT DOCUMENTS 10,972,503 B1   4/2021   Mohan et al.
11,159,366 B1  10/2021   Gawade et al.
(Continued)

FOREIGN PATENT DOCUMENTS

KR    20190058992 A    5/2019
WO    2020251828 A1   12/2020

OTHER PUBLICATIONS

International Search Report and Written Opinion for PCT Patent Application No. PCT/US21/51514, Mailed Jan. 14, 2022, 11 pages.
(Continued)

*Primary Examiner* — Midys Rojas
(74) *Attorney, Agent, or Firm* — Essential Patents Group, LLP; Christopher K. Gagne

(57) ABSTRACT

Methods and apparatus for end-to-end data plane offloading for distributed storage using protocol hardware and Protocol Independent Switch Architecture (PISA) devices. Hardware-based data plane forwarding is implemented in compute and storage switches that comprise smart server switches running software executing in a kernel and user space. The compute switch is coupled to one or more compute servers/nodes and the storage server is coupled to one or more storage servers or storage arrays. The hardware-based data plane forwarding facilitates an end-to-end data plane between the computer server(s) and storage server(s)/array(s) that is offloaded to hardware. In one example the software comprises Ceph components used to implement control plane operations in connection with hardware offloaded data plane operations, and storage traffic employs the NVMe-oF protocol and the kernels include NVMe-oF modules. In one aspect the hardware-based data plane forwarding is implemented using programmable P4switch chips. In one aspect the storage and server switches are Top of Rack (ToR) switches.

20 Claims, 16 Drawing Sheets

(56) References Cited

U.S. PATENT DOCUMENTS

| | | | |
|---|---|---|---|
| 2012/0106333 A1 | 5/2012 | Lee et al. | |
| 2014/0344532 A1* | 11/2014 | Lazier | G06F 11/0727 |
| | | | 711/154 |
| 2015/0281128 A1 | 10/2015 | Sindhu | |
| 2016/0191392 A1 | 6/2016 | Liu et al. | |
| 2017/0085501 A1 | 3/2017 | Utgikar et al. | |
| 2017/0111274 A1 | 4/2017 | Bays et al. | |
| 2017/0195257 A1 | 7/2017 | Annaluru et al. | |
| 2017/0359217 A1 | 12/2017 | Ahuja et al. | |
| 2018/0024739 A1 | 1/2018 | Schmisseur | |
| 2018/0063018 A1 | 3/2018 | Bosch et al. | |
| 2019/0123984 A1 | 4/2019 | Nainar et al. | |
| 2019/0230039 A1 | 7/2019 | Wang et al. | |
| 2019/0305985 A1 | 10/2019 | Liu | |
| 2019/0334770 A1 | 10/2019 | Xiang et al. | |
| 2019/0354386 A1 | 11/2019 | Cahana et al. | |
| 2019/0384580 A1* | 12/2019 | Martini | H04L 41/082 |
| 2020/0026425 A1 | 1/2020 | Memon et al. | |
| 2020/0052982 A1 | 2/2020 | Nainar et al. | |
| 2020/0067818 A1 | 2/2020 | Jeuk et al. | |
| 2020/0120168 A1 | 4/2020 | Nainar et al. | |
| 2020/0151035 A1 | 5/2020 | Hall | |
| 2020/0162380 A1 | 5/2020 | Pilkington et al. | |
| 2020/0169494 A1 | 5/2020 | K et al. | |
| 2020/0220848 A1 | 7/2020 | Patwardhan | |
| 2020/0236055 A1 | 7/2020 | Warnicke et al. | |
| 2020/0236064 A1 | 7/2020 | Frankel et al. | |
| 2020/0310857 A1 | 10/2020 | Sharma | |
| 2020/0313955 A1 | 10/2020 | Kodeboyina et al. | |
| 2020/0314015 A1 | 10/2020 | Mariappan et al. | |
| 2020/0344143 A1 | 10/2020 | K et al. | |
| 2020/0351332 A1 | 11/2020 | Palladino et al. | |
| 2021/0019194 A1 | 1/2021 | Bahl et al. | |
| 2021/0064430 A1 | 3/2021 | Srivastava et al. | |
| 2021/0075746 A1 | 3/2021 | Frankel | |
| 2021/0103403 A1 | 4/2021 | He et al. | |
| 2021/0409506 A1 | 12/2021 | Radi et al. | |
| 2022/0035689 A1 | 2/2022 | Raheja et al. | |
| 2022/0060569 A1 | 2/2022 | Wang et al. | |
| 2022/0142007 A1 | 5/2022 | Heydari | |
| 2022/0172037 A1 | 6/2022 | Kang et al. | |
| 2022/0225065 A1 | 7/2022 | Doken | |
| 2022/0294732 A1 | 9/2022 | Hart et al. | |
| 2024/0155024 A1 | 5/2024 | Palladino et al. | |

OTHER PUBLICATIONS

"Architecture", Architecture—Ceph Documentation, https://docs.ceph.com/en/mimic/architecture, Jun. 1, 2018. 45 pgs.

"Architecture", Architecture—Ceph Documentation, https://docs.ceph.com/en/octopus/architecture, Mar. 23, 2020. 44 pgs.

"Architecture", Architecture—Ceph Documentation, https:/docs.ceph.com/en/nautilus/architecture, Mar. 19, 2019. 45 pgs.

"Ceph (software)", https://en.wikipedia.org/wiki/Ceph_(software), Jan. 25, 2024. 15 pgs.

Non-Final Office Action from U.S. Appl. No. 17/114,304 notified Jun. 4, 2024, 40 pgs.

Non-Final Office Action from U.S. Appl. No. 17/238,960 notified Jun. 25, 2024, 19 pgs.

Non-Final Office Action from U.S. Appl. No. 17/239,329 notified Jun. 17, 2024, 11 pgs.

Extended European Search Report from European Patent Application No. 21904046.6 notified Sep. 23, 2024, 11 pgs.

Extended European Search Report from European Patent Application No. 22792172.3 notified Dec. 3, 2024, 9 pgs.

Final Office Action from U.S. Appl. No. 17/114,304 notified Oct. 16, 2024, 41 pgs.

Final Office Action from U.S. Appl. No. 17/238,960 notified Nov. 26, 2024, 27 pgs.

Final Office Action from U.S. Appl. No. 17/239,329 notified Dec. 19, 2024, 23 pgs.

Notice of Allowance from U.S. Appl. No. 17/238,960 notified Feb. 12, 2025, 11 pgs.

Notice of Allowance from U.S. Appl. No. 17/239,329 notified Mar. 5, 2025, 13 pgs.

* cited by examiner

```
> Ethernet II, Src: IntelCor_6b:0f:19 (a4:bf:01:6b:0f:19), Dst: IntelCor_6b:13:bf
> Internet Protocol Version 4, Src: 192.168.6.8, Dst: 192.168.6.7
> User Datagram Protocol, Src Port: 53768, Dst Port: 4791        702
v InfiniBand                                              704
    v Base Transport Header
        Opcode: Reliable Connection (RC) - SEND Only (4)
        0... .... = Solicited Event: False
        .0.. .... = MigReq: False
        ..00 .... = Pad Count: 0
        .... 0000 = Header Version: 0
        Partition Key: 65535            706
        Reserved: 00
        Destination Queue Pair: 0x0000b8
        1... .... = Acknowledge Request: True
        .000 0000 = Reserved (7 bits): 0
        Packet Sequence Number: 3039682
        Invariant CRC: 0xc46c1ccf        708
v NVM Express Fabrics RDMA
    [Cmd Qid: 7 (IOQ)]
v NVM Express (Cmd)
    Opcode: 0x01 Write
    [Cqe in: 5077]
    .... ..00 = Fuse Operation: 0x0
    ..00 00.. = Reserved: 0x0
    01.. .... = PRP Or SGL: 0x1
    Command ID: 0x0012
    Namespace Id: 0x00000001    710
    Reserved: 0000000000000000
    Metadata Pointer: 0x0000000000000000
    v SGL1
        0100 .... = Descriptor Type: 0x4 Keyed Data Block
        .... 1111 = Descriptor Sub Type: 0xf Transport specific
        Address: 0xffff8fc06ce76000
        Length: 1044480
        Key: 0x0053a4b1
        Start LBA: 0x00000000000007f8    712
        Absolute Number of Logical Blocks: 0x07f8
```

```
                                      ┌─802
> Ethernet II, Src: IntelCor_6b:0f:19 (a4:bf:01:6b:0f:19), Dst: IntelCor_6b:13:bf
> Internet Protocol Version 4, Src: 192.168.6.8, Dst: 192.168.6.7
> User Datagram Protocol, Src Port: 53768, Dst Port: 4791
∨ InfiniBand                            ˪804
    ∨ Base Transport Header
        Opcode: Reliable Connection (RC) - RDMA READ response First (13)
        0... .... = Solicited Event: False
        .0.. .... = MigReq: False
        ..00 .... = Pad Count: 0
        .... 0000 = Header Version: 0
        Partition Key: 65535
        Reserved: 00
        Destination Queue Pair: 0x0000b8
        0... .... = Acknowledge Request: False
        .000 0000 = Reserved (7 bits): 0
        Packet Sequence Number: 6413577
    > AETH - ACK Extended Transport Header
        Invariant CRC: 0x7da534e4
∨ NVM Express Fabrics RDMA
    [Cmd Qid: 7 (IOQ)]
    Dissection unsupported: 00000000000000000000000000000000000000000000000...
```

```
> Ethernet II, Src: IntelCor_6b:13:bf (a4:bf:01:6b:13:bf), Dst: IntelCor_6b:0f:19
> Internet Protocol Version 4, Src: 192.168.6.7  Dst: 192.168.6.8
> User Datagram Protocol, Src Port: 53768  Dst Port: 4791
v InfiniBand                                904
    v Base Transport Header
        Opcode: Reliable Connection (RC) - SEND Only with Invalidate (23)
        0... .... = Solicited Event: False
        .0.. .... = MigReq: False
        ..00 .... = Pad Count: 0
        .... 0000 = Header Version: 0
        Partition Key: 65535
        Reserved: 00
        Destination Queue Pair: 0x0000b8
        1... .... = Acknowledge Request: True
        .000 0000 = Reserved (7 bits): 0
        Packet Sequence Number: 6416638
    > IETH - Invalidate Extended Transport Header
        Invariant CRC: 0x95b25166
v NVM Express Fabrics RDMA
    [Cmd Qid: 7 (IOQ)]
v NVM Express (Cqe)
    [Cmd in: 2110]
    [Cmd Latency: 26.298 ms]
    Cmd specific Status: 0x5574e1ea71ca3870
    SQ Head Pointer: 0x0003
    Reserved: 0x0007
    Command ID: 0x0012
    0000 0000 0000 000. = Status: 0x0000
    .... .... .... ...0 = Reserved: 0x0
```

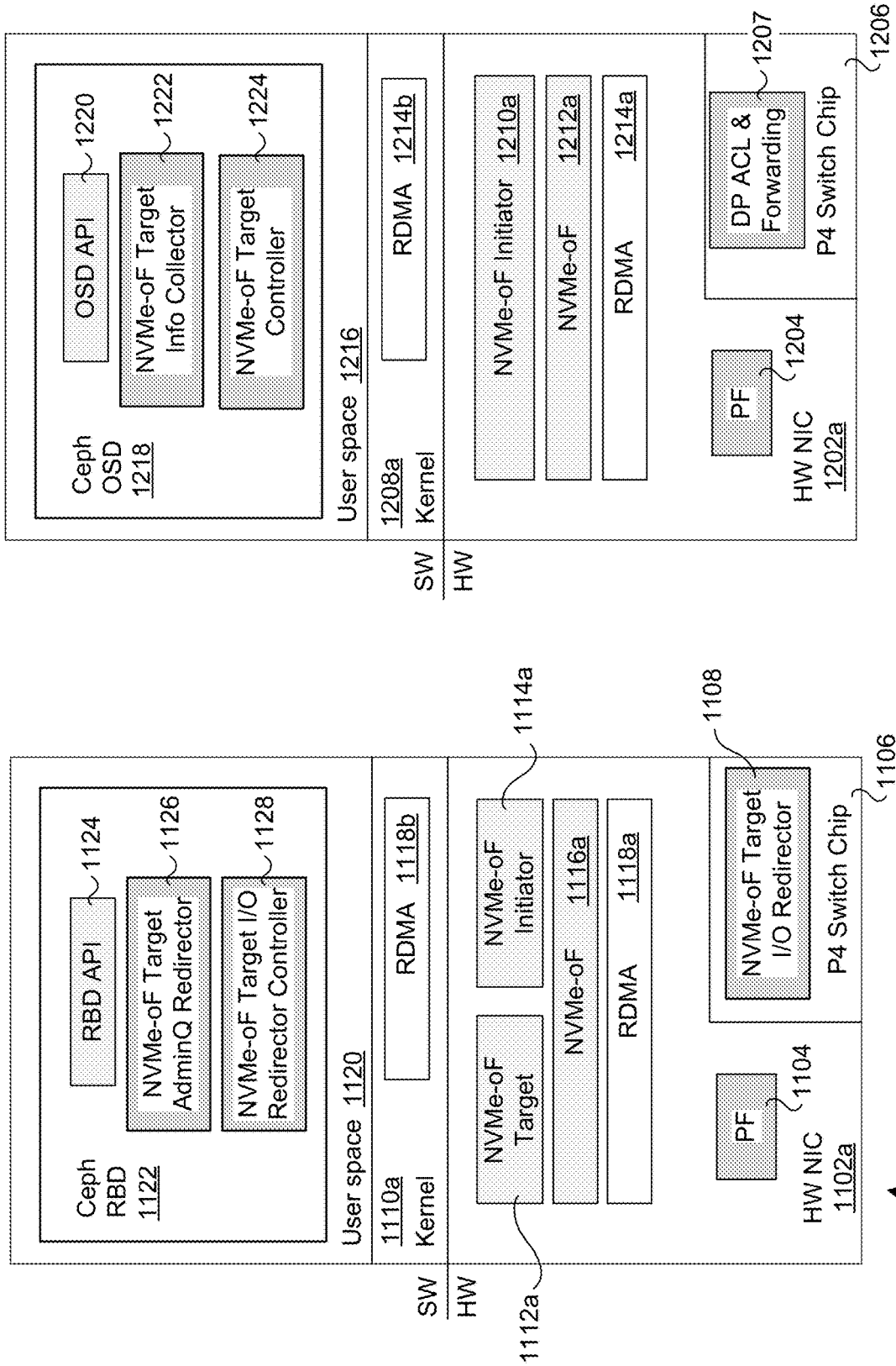

END-TO-END DATA PLANE OFFLOADING FOR DISTRIBUTED STORAGE USING PROTOCOL HARDWARE AND PISA DEVICES

BACKGROUND INFORMATION

During the past decade, there has been tremendous growth in the usage of so-called "cloud-hosted" services. Examples of such services include e-mail services provided by Microsoft (Hotmail/Outlook online), Google (Gmail) and Yahoo (Yahoo mail), productivity applications such as Microsoft Office 365 and Google Docs, and Web service platforms such as Amazon Web Services (AWS) and Elastic Compute Cloud (EC2) and Microsoft Azure. Cloud-hosted services and cloud-based architectures are also widely used for telecommunication networks and mobile services. Cloud-hosted services are typically implemented using data centers that have a very large number of compute resources, implemented in racks of various types of servers, such as blade servers filled with server blades and/or modules and other types of server configurations (e.g., 1 U, 2 U, and 4 U servers). Cloud-hosted services including Web services, Software as a Service (SaaS), Platform as a Service (PaaS), and Infrastructure as a Service (IaaS). Cloud Service Providers (CSP) have implemented growing levels of virtualization in these services. For example, deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications (including virtual network functions (VNFs), network service providers can gain flexibility in network configuration, enabling significant benefits including optimization of available bandwidth, cost savings, and faster time to market for new services.

In the IaaS cloud industry, virtualization is playing a fundamental role. Virtualized compute resources such as virtual machines (VMs) and container-based virtualization provide elasticity and scalability. Meanwhile, physical machines are also indispensable for their high-performance and comprehensive features. Under virtualization in cloud environments, very large numbers of traffic flows may exist, which poses challenges. Supporting packet processing and forwarding for such large number of flows can be very CPU (central processing unit) intensive. One solution is to use so-called "Smart" NICs (Network Interface Controllers) in the compute servers to offload routing and forwarding aspects of packet processing to hardware in the NICs. Another approach uses accelerator cards in the compute servers. However, these approaches do not address aspects of forwarding data and storage traffic between pairs of compute servers and between compute servers and storage servers that are implemented in switches in cloud infrastructures.

Distributed Storage Systems (DSS) also play a fundamental role in the IaaS cloud industry. While Ceph and NVMe-oF (Non-volatile Memory Express over Fabric) have obtained dominate positions in industry in last several years, they both have limitations under current DSS architectures and deployments. For example, implementing management software for the data plane provides enhanced functionality and flexibility, while hardware-based solutions for the data plane offer better performance. This management and performance balancing problem is not restricted to Ceph and NVMe-oF, but for other DSS deployments.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 is a code listing illustrating an example of an NVMe-oF Write command with modified fields;

FIG. 8 is a code listing illustrating an example of an NVMe-oF Data-Transfer for Write command with modified fields;

FIG. 9 is a code listing illustrating an example of an NVMe-oF Write response with modified fields;

FIG. 11a is a schematic diagram of a compute ToR switch in which the NVMe components are implemented in hardware, according to one embodiment;

FIG. 12a is a schematic diagram of a storage ToR switch in which the NVMe components are implemented in hardware, according to one embodiment.

DETAILED DESCRIPTION

Figure 1:
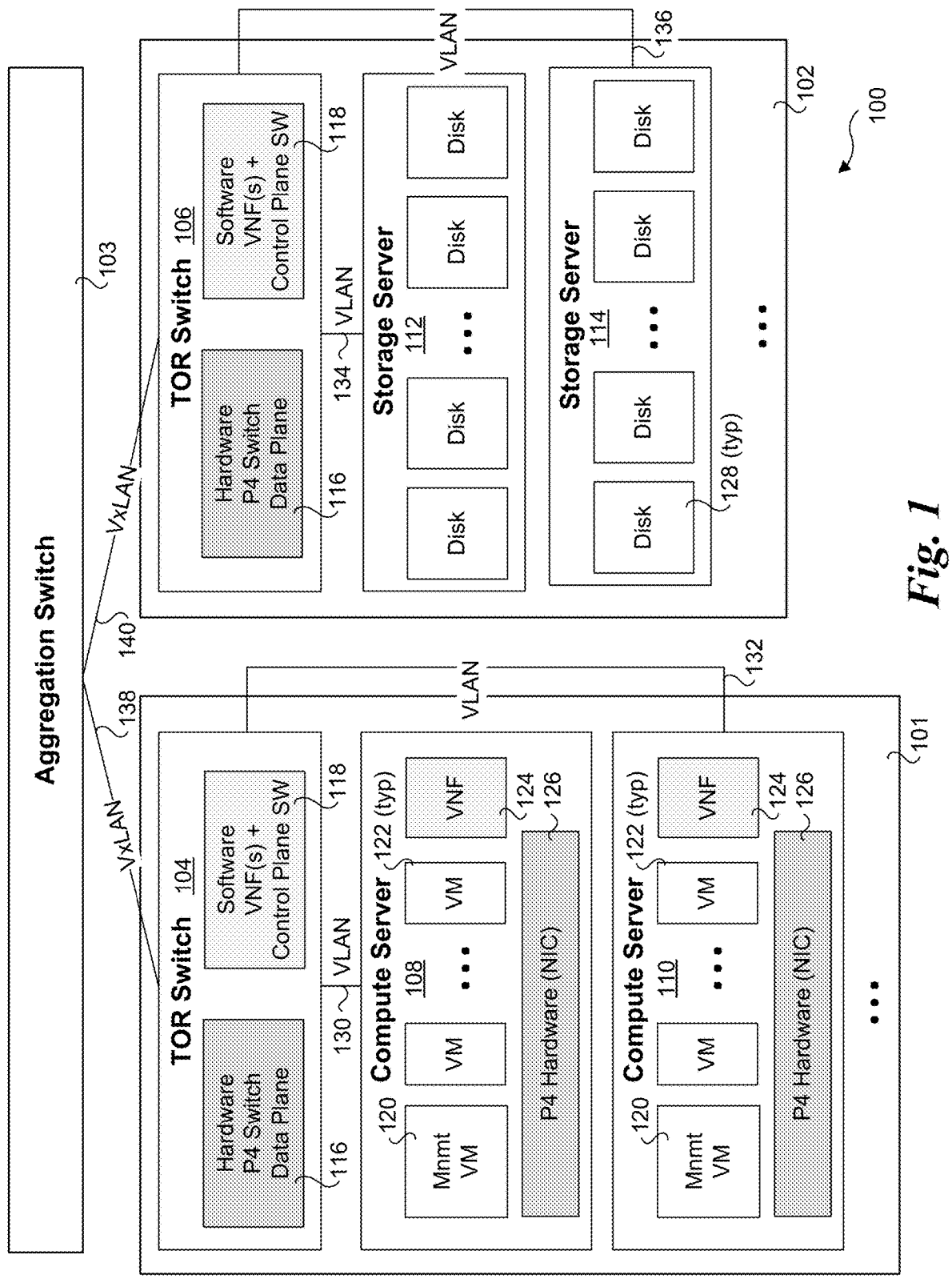
FIG. 1 is a schematic diagram illustrating an embodiment of a smart switch centered next generation cloud infrastructure.

Embodiments of methods and apparatus for end-to-end data plane offloading for distributed storage using protocol hardware and Protocol Independent Switch Architecture (PISA) devices are described herein. In the following description, numerous specific details are set forth, such as Ceph and NVMe-oF, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, methods and apparatus to separate control plane and data plane for both DSS (Ceph as an example) and Storage Protocol (NVMe-oF as an example) are provided that integrate protocol control plane into DSS control plane implemented by software, and offload the data plane to storage protocol hardware for interface and PISA devices for remapping and forwarding. This innovation leverages PISA technology to extend the self-learning NVMe-oF concept to end-to-end offloading for existing DSS. Embodiments also support multiple storage protocols (e.g. NVMe-oF and raw RDMA), multiple DSS (e.g. Ceph and Gluster), and multiple deployments (e.g. Smart Switch and Smart NIC).

In accordance with other aspects of the embodiments, smart server switches are provided that support hardware-based forwarding of data traffic and storage traffic in cloud environments employing virtualization in compute servers and storage servers. In one aspect, the hardware-based forwarding is implemented in the data plane using programming switch chips that are used to execute data plane runtime code. In some embodiments, the switch chips are P4 (named for "Programming Protocol-independent Packet Processors") chips.

FIG. 1 shows an embodiment of a smart switch centered next generation cloud infrastructure 100. For simplicity, an implementation using two racks or cabinets 101 and 102 are shown. In practice, similar architecture could be implemented on many racks. At a top level, infrastructure 100 includes an aggregation switch 102, Top of Rack (ToR) switches 104 and 106, compute servers 108 and 110, and storage servers 112 and 114. Each of ToR switches 104 and 106 include a hardware-based P4 switch 116 and one or more software-based virtual network functions (VNFs)+ control plane software 118. As further shown, data plane operations are performed in hardware (via hardware-based P4 switch 116), while control plane operations are performed in software (e.g., via control plane software).

Each of compute servers 108 and 110 includes software components comprising a management VM 120, one or more VMs 122, and one or more VNFs 124 (only one of which is shown). Each compute server 108 and 110 also includes a NIC (network interface controller) 126 including a P4 NIC chips. Each of storage servers 112 and 114 includes a plurality of storage devices depicted as disks 128 for illustrative purposes. Generally, disks 128 are illustrative of a variety of types of non-volatile storage devices including solid-state disks and magnetic disks, as well as storage devices having other form factors such as NVDIMMs (Non-volatile Dual Inline Memory Modules).

ToR switch 104 is connected to compute server 108 via a virtual local area network (VLAN) link 130 and to compute server 110 via a VLAN link 132. ToR switch 106 is connected to storage server 112 via a VLAN link 134 and to storage server 114 via a VLAN link 136. In the illustrated embodiment, ToR switches 104 and 106 are respectfully connected to aggregation switch 103 via VxLAN (Virtual Extensible LAN) links 138 and 140. VxLAN is a network virtualization technology used to support scalability in large cloud computing deployments. VxLAN is a tunneling protocol that encapsulates Layer 2 Ethernet frames in Layer 4 User Datagram Protocol (UDP) datagrams (also referred as UDP packets), enabling operators to create virtualized Layer 2 subnets, or segments, that span physical Layer 3 networks.

Figure 2:
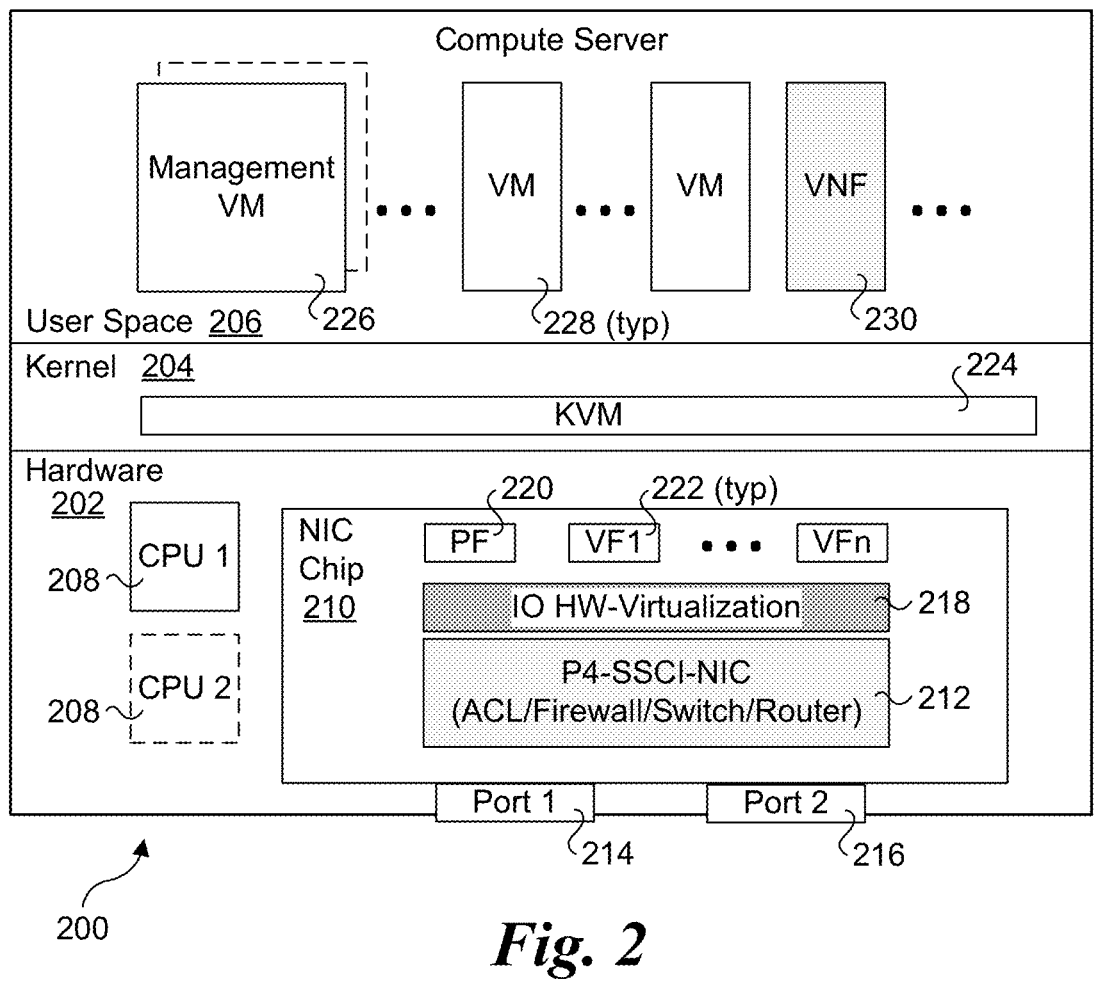
FIG. 2 is a schematic diagram of a compute server, according to one embodiment.

FIG. 2 shows selective aspects of a compute server 200, according to one embodiment. Compute server 200 is depicted with hardware 200, an operating system kernel 204, and user space 206, the latter two of which would be implemented in memory on the compute server. Hardware 202 is depicted as including one of more CPUs 208 and a NIC chip 210. In one embodiment, a CPU 208 is a multi-core processor. NIC chip 210 includes a P4-SSCI (Smart Switch centered next generation Cloud Infrastructure)-NIC block 212, one or more ports (depicted as ports 214 and 216), an IO (Input-Output) hardware-virtualization layer 218, one or more physical functions (PF) 220, and one or more virtual functions 222, depicted as VF1 . . . VFn.

In the illustrated embodiment, kernel 204 is a Linux kernel and includes a Linux KVM (Kernel-based Virtual Machine) 224. A Linux KVM is a full virtualization solution for Linux on x86 hardware containing virtualization extensions (Intel® VT or AMD®-V). It consists of a loadable kernel module, kvm.ko, that provides the core virtualization infrastructure and a processor specific module, kvm-intel.ko or kvm-amd.ko.

User space 206 in used to load and execute various software components and applications. These include one or more management VMs 226, a plurality of VMs 228, and one or more VNFs 230. User space 206 also includes additional KVM virtualization components that are implemented in user space rather than the Linux kernel, such as QEMU in some embodiments. QEMU is generic and open-source machine emulator and virtualizer.

P4-SSCI-NIC block 212 employs the P4 language, P4Runtime, and associated libraries to enable NIC Chip 210 to be dynamically programmed to implement a packet processing pipeline. In one embodiment, NIC chip 210 includes circuitry to support P4 applications (e.g., applications written in the P4 language). Once programmed, P4-SSCI-NIC block 212 may support one or more of ACL (action control list) functions, firewall functions, switch functions, and/or router functions. Further details of programming with P4 and associated functionality are described below.

Figure 3:
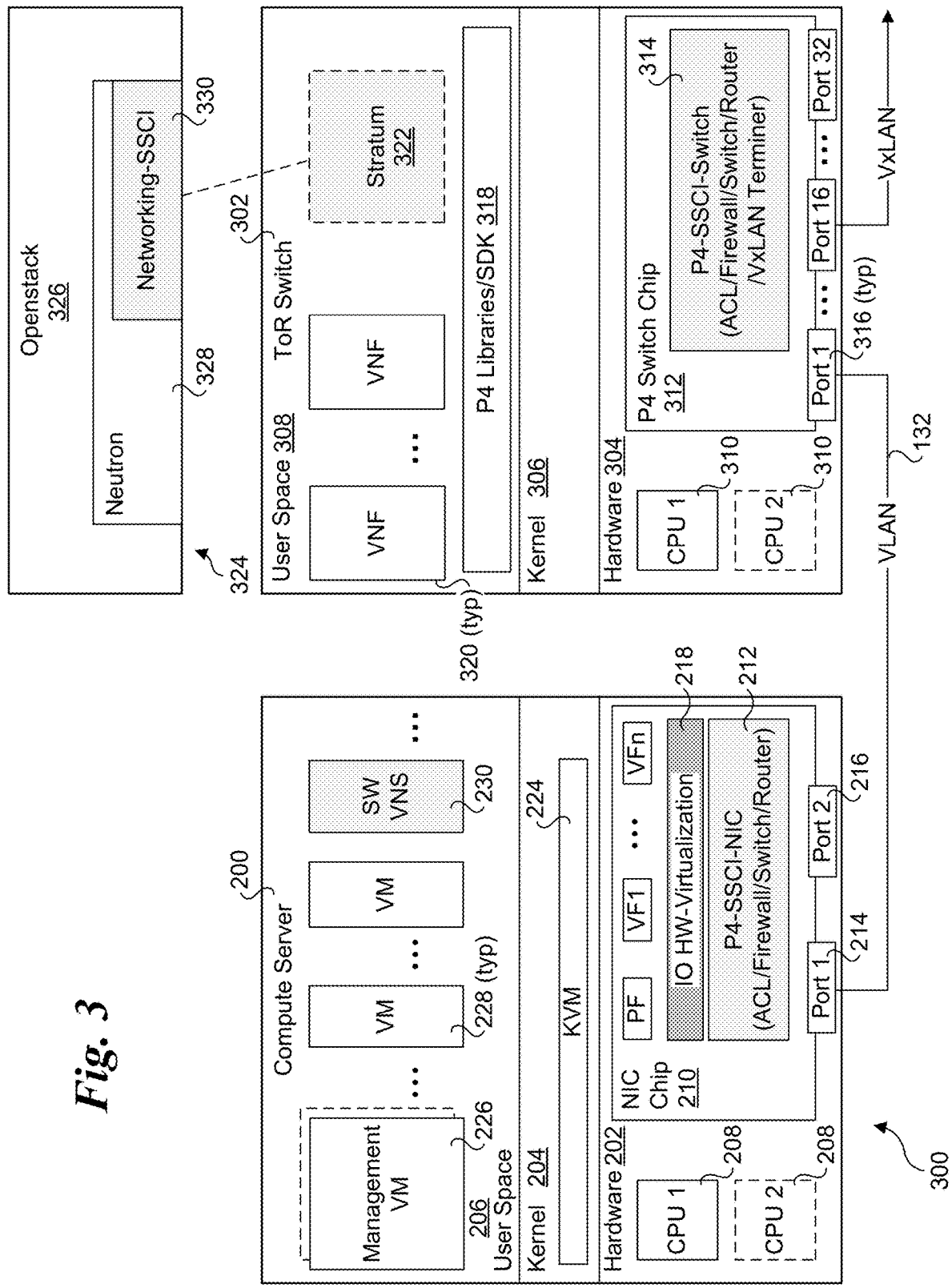
FIG. 3 is a schematic diagram illustrating aspects of the smart switch centered next generation cloud infrastructure of FIG. 1 including a compute server and a Top of Rack (ToR) switch implemented as a smart server switch.

FIG. 3 shows an architecture 300 include compute server 200 coupled to a ToR switch 302. As depicted by like-numbered reference numbers, the configuration of compute server 200 in FIGS. 2 and 3 are similar. Accordingly, the following description focuses on ToR switch 302 and components that interact with ToR switch 302.

In one embodiment, ToR switch is a "server switch," meaning it is a switch having an underlying architecture similar to a compute server that supports switching functionality. ToR switch 302 is logically partitioned as hardware 304, an OS kernel 306, and user space 308. Hardware 304 includes one or more CPUs 310 and a P4 switch chip 312. P4 switch chip 314 includes a P4-SSCI-Switch block 314, and multiple ports 316. In the illustrated example, there are 32 ports, but this is merely exemplary as other numbers of ports may be implemented, such as 24, 28, 36, etc.). P4-S SCI-Switch block 314 is programmed using P4 and may support one or more functions including ACL functions, firewall functions, switch functions, and router functions. P4-S SCI-Switch block 314 also operates as a VxLAN terminator to support VxLAN operations.

Application-level software are executed in user space 308. This includes P4 libraries/SDK 318, one or more VNFs 320, and a Statum 322. Stratum is an open source silicon-independent switch operating system for SDNs. Stratum exposes a set of next-generation SDN interfaces including P4Runtime and OpenConfig, enabling interchangeability of forwarding devices and programmability of forwarding behaviors. Stratum defines a contract defining forwarding behavior supported by the data plane, expressed in P4 language.

Architecture 300 further shows an external server 324 running Openstack 326. The OpenStack project is a global collaboration of developers and cloud computing technologists producing an open standard cloud computing platform for both public and private clouds. OpenStack is a free open standard cloud computing platform, mostly deployed as infrastructure-as-a-service (IaaS) in both public and private clouds. Server 324 is also running Neutron 328, which includes a networking-SSCI block 330. Neutron is an OpenStack project to provide "networking as a service" between interface devices (e.g., vNICs) managed by other Openstack services (e.g., nova). Networking-SSCI block 330 provides communication between Neutron 328 and Stratum 322.

P4 is a language for expressing how packets are processed by the data plane of a forwarding element such as a hardware or software switch, network interface card/controller (NIC), router, or network appliance. Many targets (in particular targets following an SDN architecture) implement a separate control plane and a data plane. P4 is designed to specify the data plane functionality of the target.

Separately, P4 programs can also be used along with P4Runtime to partially define the interface by which the control plane and the data-plane communicate. In this scenario, P4 is first used to describe the forwarding behavior and this in turn is converted by a P4 compiler into the metadata needed for the control plane and data plane to communicate. The data plane need not be programmable for P4 and P4Runtime to be of value in unambiguously defining the capabilities of the data plane and how the control plane can control these capabilities.

Figure 4:
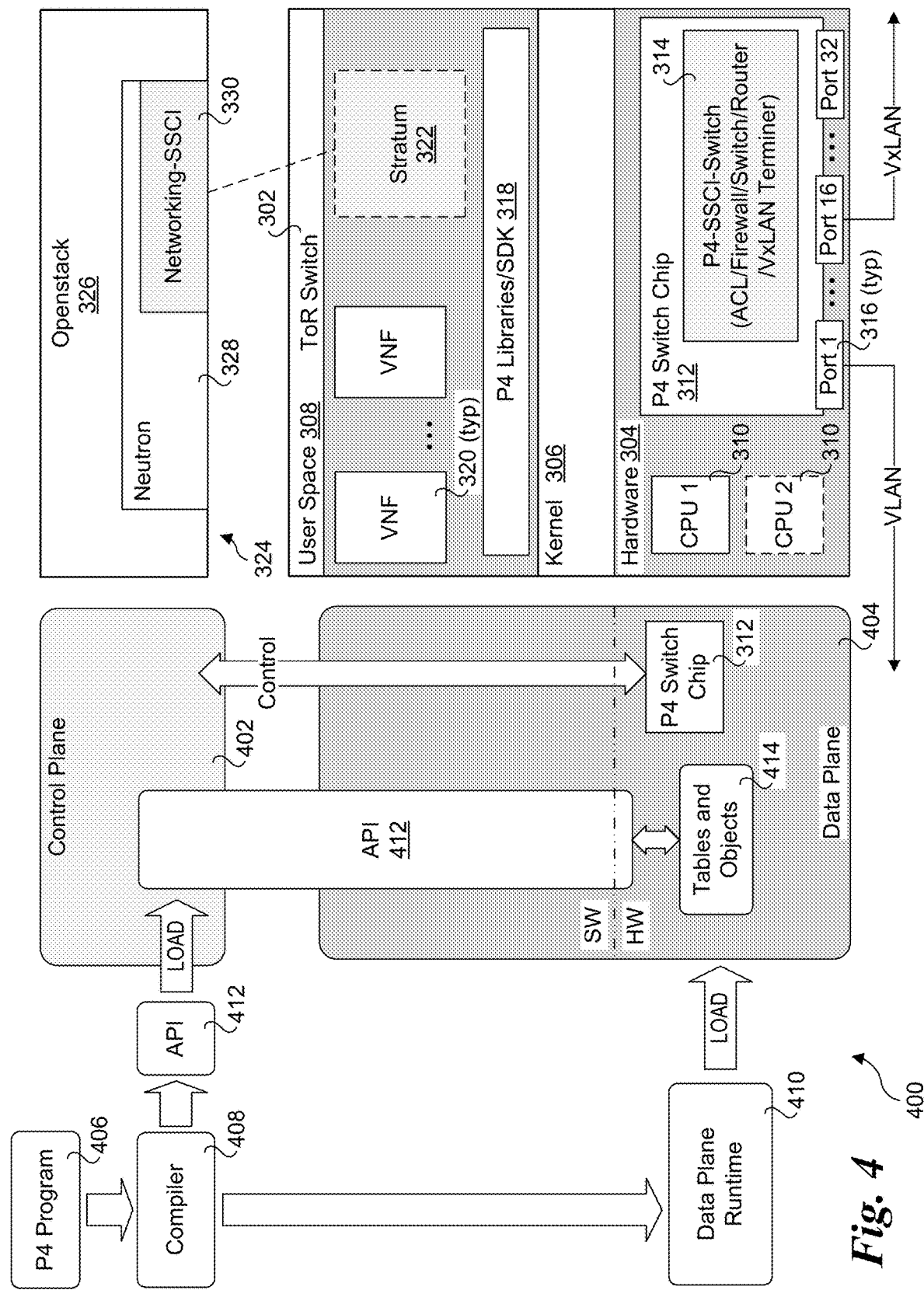
FIG. 4 is a diagram illustrating aspects of a P4 programming model and deployment under which control plane operations are implemented in a server that is separate from the ToR switch.

FIG. 4 shows an architecture 400 the overlays aspects of a P4 program implementation using ToR switch 302 and server 324 of FIG. 3. The implementation is logically divided into a control plane 402 and a data plane 404, which in turn is split into a software layer and a hardware layer. A P4 program is written and compiled by a compiler 408, which outputs data plane runtime code 410 and an API 412. The data plane runtime code 410 is loaded to P4 switch chip 312, which is part of the HW data plane. All or a portion of tables and objects 414 are also deployed in the HW data plane.

The control plane 402 aspects of the P4 deployment model enables software running on a server or the like to implement control plane operations using API 412. API 412 provides a means for communicating with and controlling data plane runtime code 410 running on P4 switch chip 312, wherein API 412 may leverage use of P4 Libraries/SKD 318.

Figure 4A:
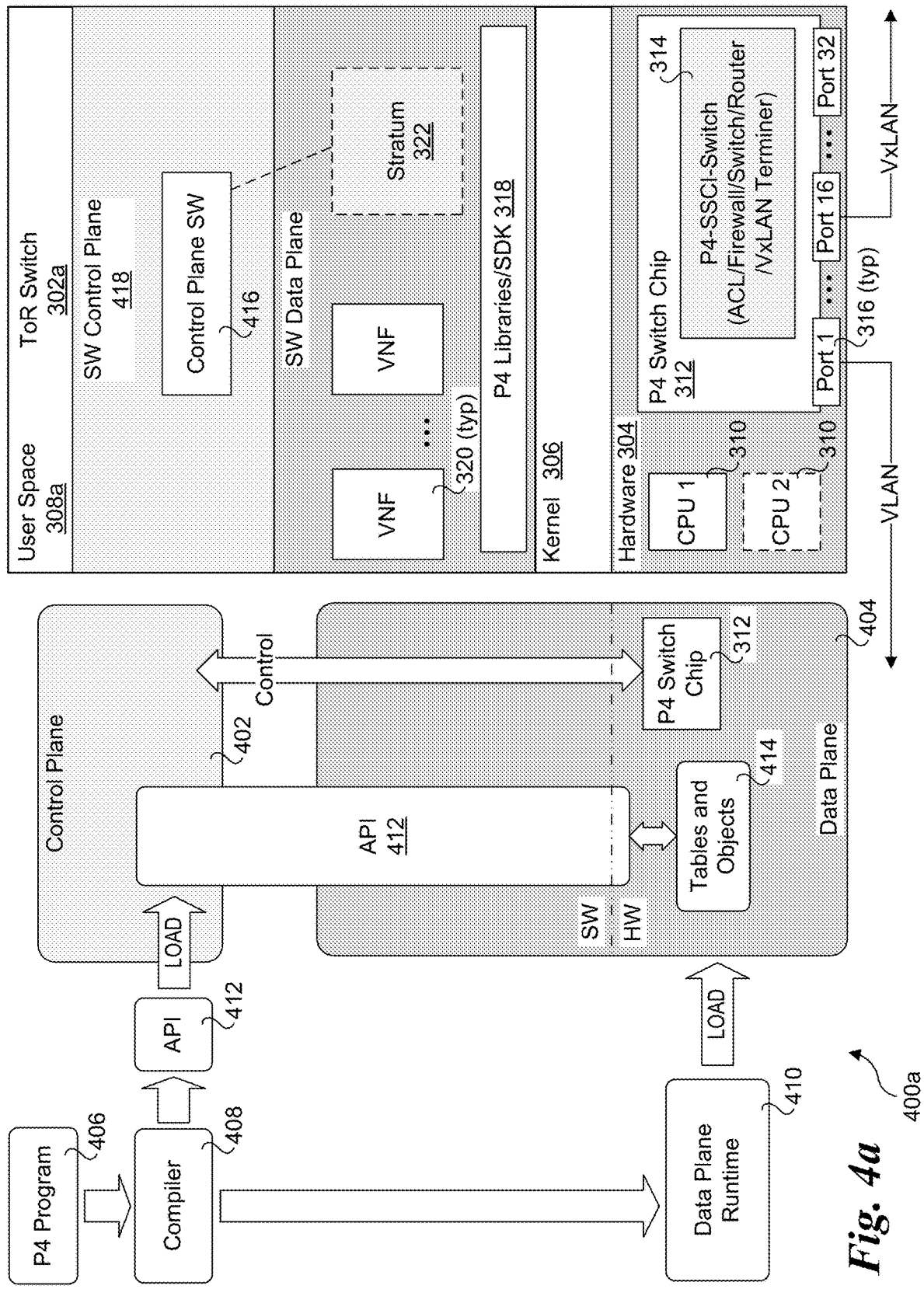
FIG. 4a is a diagram illustrating aspects of a P4 programming model and deployment under which control plane operations are implemented via software running in the user space of the ToR switch.

Under the configuration illustrated in FIG. 4, the control plane aspects are implemented in server 324, which is separate from ToR switch 302. Under an alternative architecture 400a shown in FIG. 4a, both the control plane and data plane are implemented in a ToR switch 302a, wherein the control plane aspects are implemented via control plane software 416 that is executed in user space 308a and is associated with SW control plane 418. While FIG. 4a shows control plane SW 416 interfacing with stratum 322, in other embodiments stratum 322 is not used. Generally, control plane SW 416 may use API 412 to communicate with and control data plane runtime code running in P4 Switch 312

Generally, the primary data plane workload of ToR switch 302 and ToR switch 302a is performed in hardware via P4 data plane runtime code executing on P4 switch chip 312. The use of one of more VNFs 320 is optional. Some functions that are commonly associated with data plane aspects may be implemented in one or more VNFs. For example, this may include an VNF (or NFV) to track a customers specific connections.

In some embodiments, P4 switch chip 312 comprises a P4 switch chip provided by Barefoot Networks®. In some embodiments P4 switch chip 312 is a Barefoot Networks® Tofino chip that implements a Protocol Independent Switch Architecture (PISA) and can be programmed using P4. In embodiments, employing Barefoot Networks® switch chips, P4 libraries/SDK and compiler 408 are provided by Barefoot Networks®.

Figure 5:
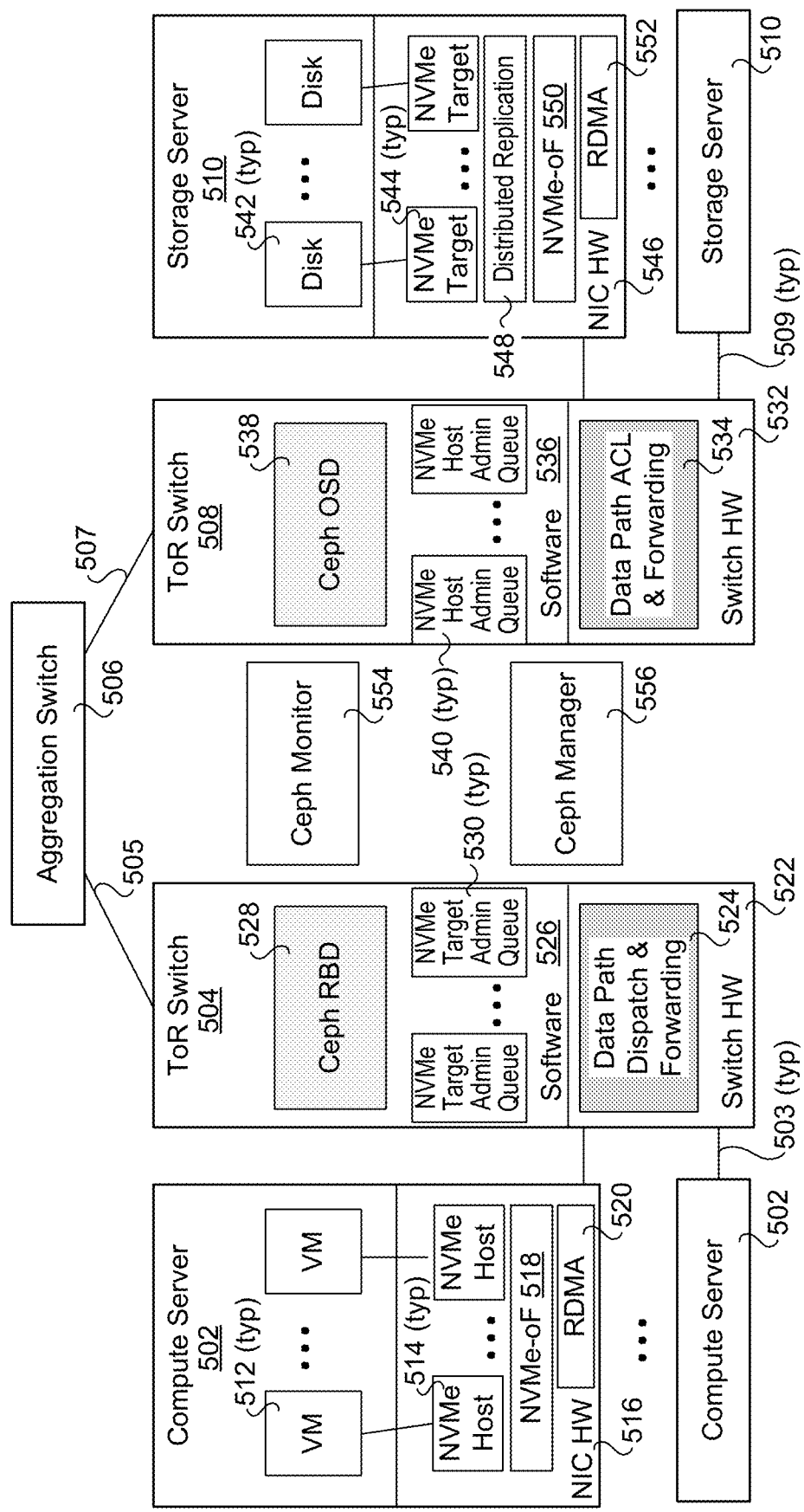
FIG. 5 is a schematic diagram of a smart switch centered next generation cloud infrastructure architecture supporting end-to-end hardware forwarding for storage traffic, according to one embodiment.

FIG. 5 shows an architecture 500 providing compute servers with access to storage services provided by storage servers. Under the embodiment of architecture 500, the compute servers and storage servers are deployed in separate racks, while under a variant of architecture 500 (not shown) the compute servers and storage servers may reside in the same rack.

In further detail, architecture 500 depicts multiple compute servers 502 having similar configurations coupled to a ToR switch 504 via links 503. ToR switch 504 is connected to a ToR switch 508 via an aggregation switch 506 and links 505 and 507, and is connected to multiple storage servers 510 via links 511. Since ToR switch 504 is coupled to a compute server it is also referred to as the compute-side ToR switch, while ToR switch 508, which is coupled to storage servers, is also referred to as the storage-side ToR switch. Compute server 502 includes one or more VMs 512 that are connected to a respective NVMe (Non-Volatile Memory Express) host 514 implemented in NIC hardware 516. NIC hardware 516 further includes an NVMe-oF (Non-Volatile Memory Express over Fabric) block 518 and an RDMA (Remote Direct Memory Access) block 520 that is configured to employ RDMA verbs to support remote access to data stored on storage servers 510.

In some embodiments ToR switch 504 is a server switch having switch hardware 522 similar to hardware 304. Functionality implemented in switch hardware 522 includes a data path and dispatch forwarding block 524. Software 526 for ToR switch 504 includes Ceph RBD (Reliable Autonomic Distributed Object Store (RADOS) Block Device) module 528 and one or more NVMe target admin queues 530. Ceph is a distributed object, block, and file storage platform that is part of the open source Ceph project. Ceph's object storage system allows users to mount Ceph as a thin-provisioned block device. When an application writes data to Ceph using a block device, Ceph automatically stripes and replicates the data across the cluster. Ceph's RBD also integrates with Kernel-based Virtual Machines (KVMs).

In some embodiments ToR switch 508 is a server switch having switch hardware 532 similar to hardware 304. Functionality implemented in switch hardware 532 includes a data path ACL and forwarding block 534. Software 536 for ToR switch 508 includes Ceph Object Storage Daemon (OSD) 538 and one or more NVMe host admin queues 540. Ceph OSD 538 is the object storage daemon for the Ceph distributed file system. It is responsible for storing objects on a local file system and providing access to them over the network.

Storage server 510 includes a plurality of disks 512 that are connected to respective NVMe targets 544 implemented in MC hardware 546. NIC hardware 546 further includes a distributed replication block 548, an NVMe-oF block 550 and an a RDMA block 552 that is configured to employ RDMA verbs to support host-side access to data stored in disks 542 in connection with RDMA block 520 on compute servers. Generally, disks 542 represents some form of storage device, which may have a physical disk form factor, such as an SSD (solid-state disk), magnetic disk, or optical disk, or may comprise another form of non-volatile storage, such as a storage class memory (SCM) device including NVDIMMs (Non-Volatile Dual Inline Memory Modules) as well as other NVM devices.

In addition to the Ceph RBD module 528 and Ceph OSD module 538, architecture 500 includes a Ceph monitor 554 and a Ceph manager daemon 556. A Ceph Monitor (ceph-mon) maintains maps of the cluster state, including the monitor map, manager map, the OSD map, the metadata server (MDS) map, and the CRUSH (Controlled Replication Under Scalable Hashing) map. Monitors are also responsible for managing authentication between daemons and clients. A Ceph Manager daemon (ceph-mgr) is responsible for keeping track of runtime metrics and the current state of the Ceph cluster, including storage utilization, current performance metrics, and system load. The Ceph Manager daemons also host python-based modules to manage and expose Ceph cluster information, including a web-based Ceph Dashboard and REST API.

Under Architecture 500, the end-to-end data plane forwarding and routing is offloaded to hardware (e.g., NVMe-oF hardware and P4 switch hardware), while leveraging aspects of the Ceph distributed file system that support exabyte-level scalability and data resiliency. Moreover, disks 542, which are accessed over links 503, 505, 507, and 509 using RDMA verbs and the NVMe-oF protocol, appear to VMs 512 on compute servers 502 as if they are local disks.

The major components for Ceph are still implemented in architecture 500: Ceph Manager, Ceph Monitor, Ceph RBD, Ceph OSD and an NVMe-oF Storage Server as the Ceph Target. However, in one embodiment the following changes to the conventional Ceph deployment are made. First, Ceph RBD is moved from the "compute server" to compute-side ToR Switch or Smart NIC. NVMe-oF target Admin functions are implemented software, e.g. NVMe-oF discovery, connecting etc. request. Then some Admin commands (e.g. create I/O Queue) are forwarded to "Ceph OSD" in the storage-side ToR Switch to setup and maintain end-to-end storage connections. The Ceph object concept is still used, but a bigger size may be used, e.g. 1 GB, rather 4 MB used by a normal deployment.

Ceph RBD is further made configurable to serve multiple NVMe namespaces to the Computer Server for each VM connected with virtual "NVMe Host." For simple implementation, assume one disk in VM only requests one namespace from one RBD. Each namespace is separated into Ceph objects, e.g. 4 GB namespace needs 4 Ceph objects of size 1 GB. Ceph RBD still communicates with the Ceph Monitor and uses the CRUSH algorithm and maps to decide which OSD and Disk should be used for Read/Write for each Ceph Object in form of "Placement Group".

In one embodiment, the following changes are made to Ceph OSD. First, Ceph OSD is moved from the "Storage Server" to the storage-side ToR (or to Smart NIC for "Extended Use Case" discussed below, or part of them remain in the "Storage Server" according to one embodiment). Ceph OSD is configured to act as an NVMe-oF initiator to setup another set of NVMe-oF Admin Queues with the "Storage Server." Ceph OSD is also configured to accept NVMe-oF Admin Commands from Ceph RBD and set up appropriate NVMe-oF I/O Queue with the "Storage Server" according to requests originally from the VM.

Data Path Dispatch and Forwarding block 524 is newly added in the compute-side TOR switch hardware using a hardware program language such as P4. This component is used to store dispatch rules for NVMe-oF I/O Queue packets matched by "Namespace ID" and Ceph Object offset calculated from "Start LBA", then modify related packet fields (Green Masked in FIGS. 2,3,4) and forward to the primary Ceph OSD. If CRUSH maps or other condition changes, Ceph RBD needs to update those dispatch rules into Switch hardware. The switch hardware monitors I/O request/response using a P4 program (in one embodiment) to detect a target Storage Server fail. If a fail is detected, the switch hardware notifies Ceph RBD. Ceph RBD will the update the backup OSD as primary to switch hardware and send a "Temporary failure, try later" message to the VM NVMe software stack.

Data Path ACL and Forwarding block 534 is a newly added switch hardware function in the storage-side TOR switch programmed by a hardware programing language such as P4 in one embodiment. Data Path ACL and Forwarding block 534 is used to store ACL rules to forward or reject NVMe-oF I/O packets from RBD match by "Namespace ID" and Ceph Object offset. If matched, it is configured to modify related packets fields (Yellow Masked in FIG. 2,3,4) and forward to an according Storage Server. Packets from the Storage Server to Ceph RBD do not need ACL, but still need fields modification.

"Distributed Replication" is a hardware function newly added in the NIC's NVMe-oF target offloading module to finish the distributed storage replication, e.g., 3 copy or Erasure Code. This includes storing peer NVMe-oF addresses based on Placement Group (PG). When one write is sent to one PG, a related replicate write is generated and sent to peers according to a replication algorithm. When all peers finish their writes, this primary target return success to Ceph RBD then forwards to the final VM NVMe host.

Figure 6A:
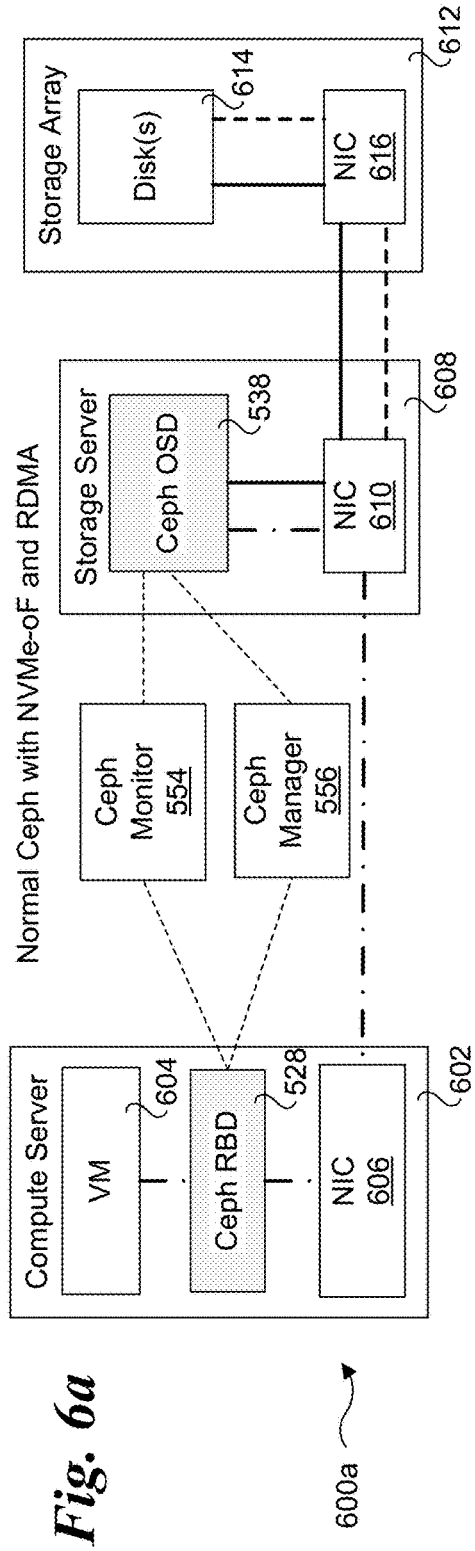
FIG. 6a is a schematic flow diagram illustrating a normal Ceph flow with NVMe-oF and RDMA.
Figure 6B:
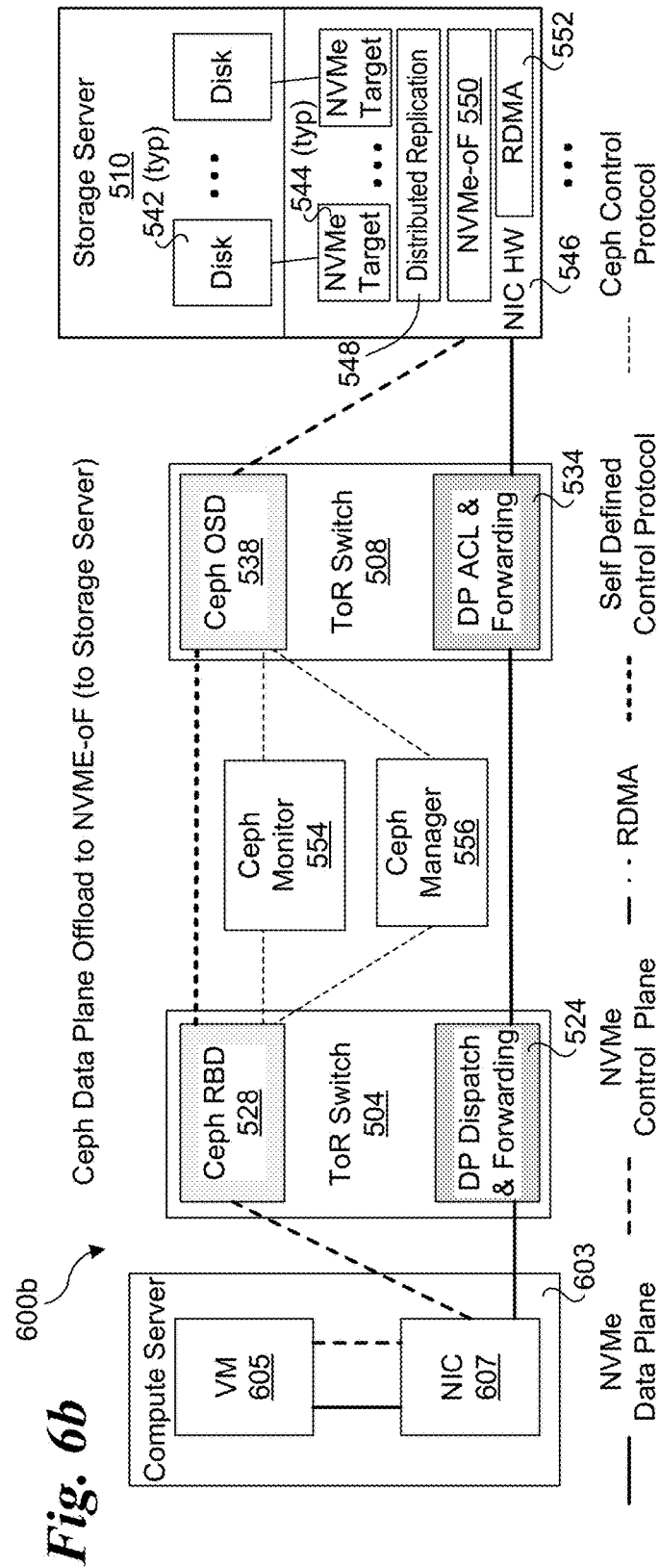
FIG. 6b is a schematic flow diagram illustrating a Ceph data plane offload to NVMe-oF, where the storage ToR switch is connected to a storage server.
Figure 6C:
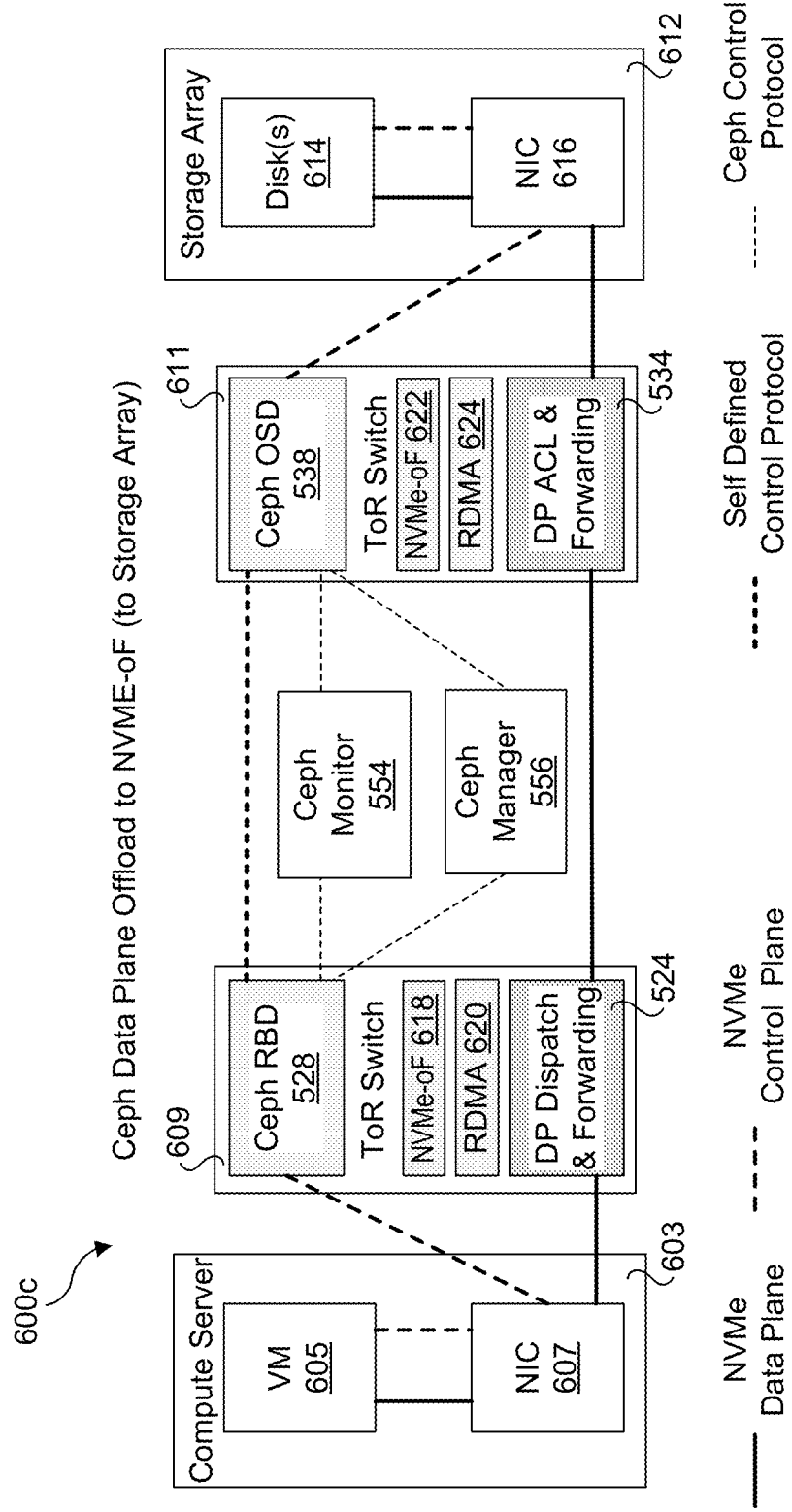
FIG. 6c is a schematic flow diagram illustrating a Ceph data plane offload to NVMe-oF, where the storage ToR switch is connected to a storage server.

FIGS. 6a, 6b, and 6c show data flow comparisons between normal Ceph with NVME-oF and RDMA (diagram 600a) and with data plane offloaded Ceph (diagrams 600b and 600c) in accordance with aspects of embodiments disclosed herein. As shown in diagram 600a, the normal Ceph deployment includes a computer server (or node) 602, a storage server (or node) 608, and a storage array (or node) 612. Compute server 602 includes a VM 604, a Ceph RBD module 528, and a NIC 606. Storage server 608 includes a Ceph OSD module 538 and a NIC 610. Storage array 612 includes a disk(s) 614, which is/are representative of one or more block storage devices, such as an SSD, magnetic disk, optical disk, or SCM device such as NVDIMMs or other NVM devices. Ceph monitor 554 and Ceph manager 556 may be running on compute server 602 or 608 or more likely another compute server (not shown) and are used the monitor and manage Ceph operations, as described above. Under the normal Ceph deployment, data plane operations and associated data transfers go through Ceph RBD module 528 and Ceph OSD module 538, which are both implemented in software.

Under the Ceph data plane offload to NVMe-oF shown in diagram 600b, the data plane operations and associated data transfers are offloaded to hardware, which provides as much as 10 times the bandwidth and less than 0.1 times the latency when compared with the normal Ceph deployment in diagram 600a. The data plane offload deployment supports end-to-end offloaded data plane transfers between a compute server 603 including a VM 605 and a NIC 607 and storage server 510. The ToR switches 504 and 508 have a similar configuration to that shown in FIG. 5 (which some modules/components not shown for simplicity). ToR switch 504 includes a Ceph RBD module 528 and data plane (DP) Dispatch and Forwarding block 524. ToR switch 508 includes a Ceph OSD module 538 and a data plane ACL and Forwarding block 534.

As illustrated in FIG. 5 and discussed above, both data plane Dispatch and Forwarding block 524 and data plane ACL and Forwarding block 534 are implemented in hardware. NICs 607 and 616 also comprise hardware. Thus, the entire data NVMe data plane is implemented in hardware. Meanwhile, NVMe control plane aspects are implemented in software using Ceph RBD module 528, Ceph OSD 538, Ceph monitor 554 and Ceph manager 556.

FIG. 6c shows another embodiment in which the compute and storage ToR switches further include NVMe-oF and RDMA components and storage server 510 is replaced with a storage array 612. In further detail, NIC 607 is coupled to a compute ToR switch 609 implemented as a server switch including a Ceph RBD module 528, an NVMe-oF module 618, an RDMA module 620, and a data plane Dispatch and Forwarding block 524. Compute ToR switch 609 is connected to a storage ToR switch 611 including a Ceph OSD module 538, an NVMe-oF module 622, an RDMA module 624, and a data plane ACL and Forwarding block 534. Further details of embodiments for a compute server/node, compute ToR switch and server ToR switch are discussed below with reference to FIGS. 10, 11, and 12, respectively.

Under the configuration of FIG. 6c, there is no need for a separate storage server since Ceph OSD module 538, NVMe-oF module 622, and RDMA module 624 or implemented in storage ToR switch 611. Rather, a storage array or similar storage apparatus may be used. This may include a storage drawer or the like under a disaggregated architecture such as Intel® Rack Space Design.

As used herein, a logical storage unit comprises a storage object, storage block, file (e.g., in a file system) or other type of data structure (e.g., database table or object). Under the end-to-end data plane offloaded to hardware the compute server (or node) issues storage access requests referencing the logical storage unit to access without needing to know the destination of the physical storage device on which the logical storage unit is stored. The Ceph storage architecture abstracts the logical storage units from their associated physical storage devices. Moreover, replication of storage data is performed in a manner that is transparent to the computer servers.

Packet Field Modification for I/O Queue Packets

Under embodiments of end-to-end hardware offloading for NVMe-oF traffic, packet field modifications (relative to conventional RDMA-NVMe-oF usages) are implemented. Examples of such field modification as applied to RoCE (RDMA over Converged Ethernet) are shown in FIGS. 7, 8 and 9.

FIG. 7 shows modified fields corresponding to an example of an NVMe-oF Write command 700. As shown, changes for the compute-side ToR switch include the Destination Address (Dst:) 702 and the destination port (Dst Port:) 704. Changes to the storage-side ToR switch include the Destination Queue Pair 706, the Packet Sequence Number 708, the Namespace Id 710, and the start LBA (logical block address) 712.

FIG. 8 shows modified fields corresponding to an example of an NVMe-oF data transfer for Write command 800. Changes for the compute-side ToR switch include the Source Address (Src:) 802 and the Src port (Src Port:) 804.

FIG. 9 shows modified fields corresponding to an example of an NVMe-oF Write response 900. Changes for the compute-side ToR switch include the Source Address (Src:) 902 and the Src port (Src Port:) 904.

Figure 10:
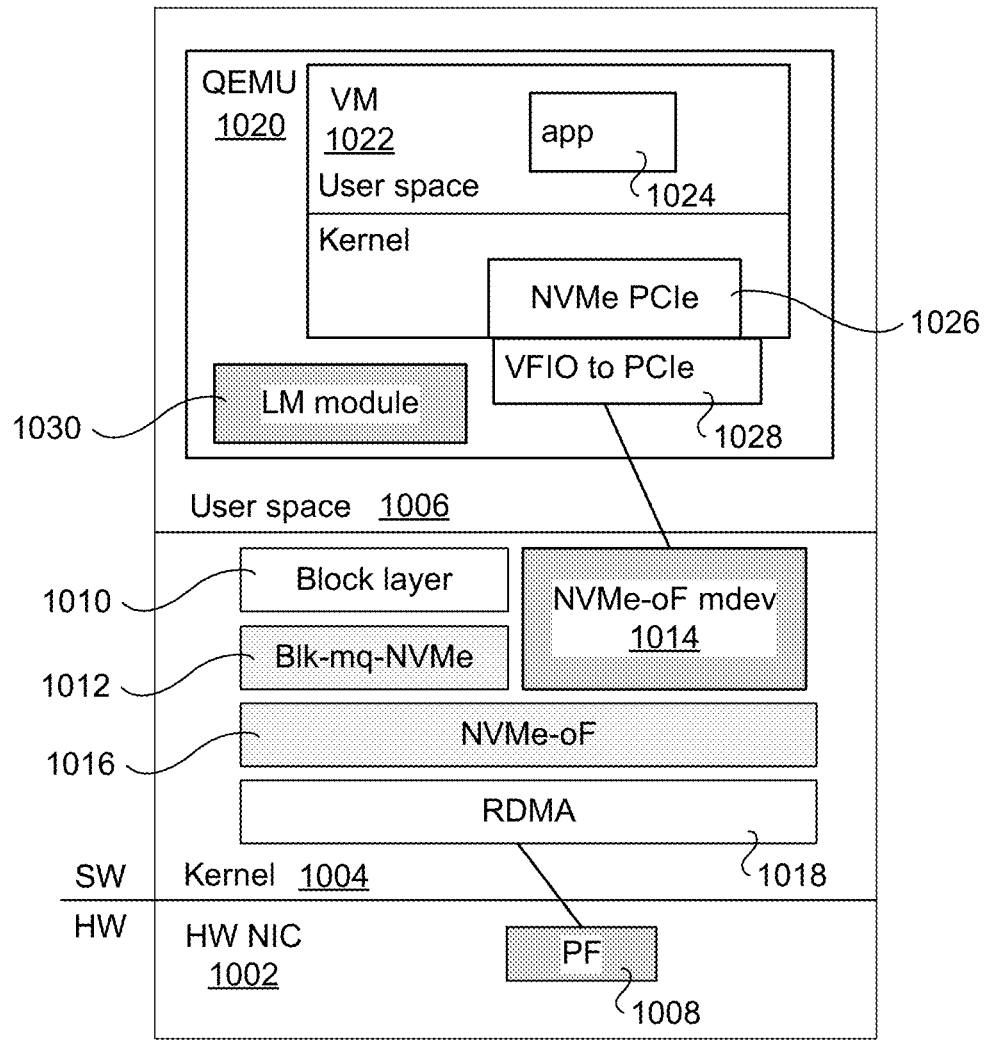
FIG. 10 is a schematic diagram of a compute node, according to one embodiment.

FIG. 10 shows a compute node 1000, according to one embodiment. Compute node 1000 includes a hardware layer including a NIC 1002 and software including an OS kernel 1004 and a user space 1006. NIC 1002 includes a physical function (PF) 1008 in addition to other components commonly associated with NICS, such as network ports, input and output buffers, a packet processing pipeline, one or more virtual functions, etc.; for simplicity only PF 1008 is shown. In one embodiment NIC 1002 comprises an Intel® e810 NIC.

OS kernel 1004 includes a block layer 1010 a Blk-mq-NVMe (Block-Multiple Queue-NVMe) module 1012, and NVMe-oF mdev (mediated device) 1014, an NVMe-oF module 1016 and an RDMA module 1018. User space 1006 includes a QEMU instance 1020, a VM 1022 including a user space in which an application 1024 is run and a kernel including an NVMe PCI-E driver 1026 coupled to a VFIO to PCIe (virtual function input-output to Peripheral Component Interconnect Express) interface 628 interface 1028. QEMU 1020 further includes an LM module 1030.

Figure 11:
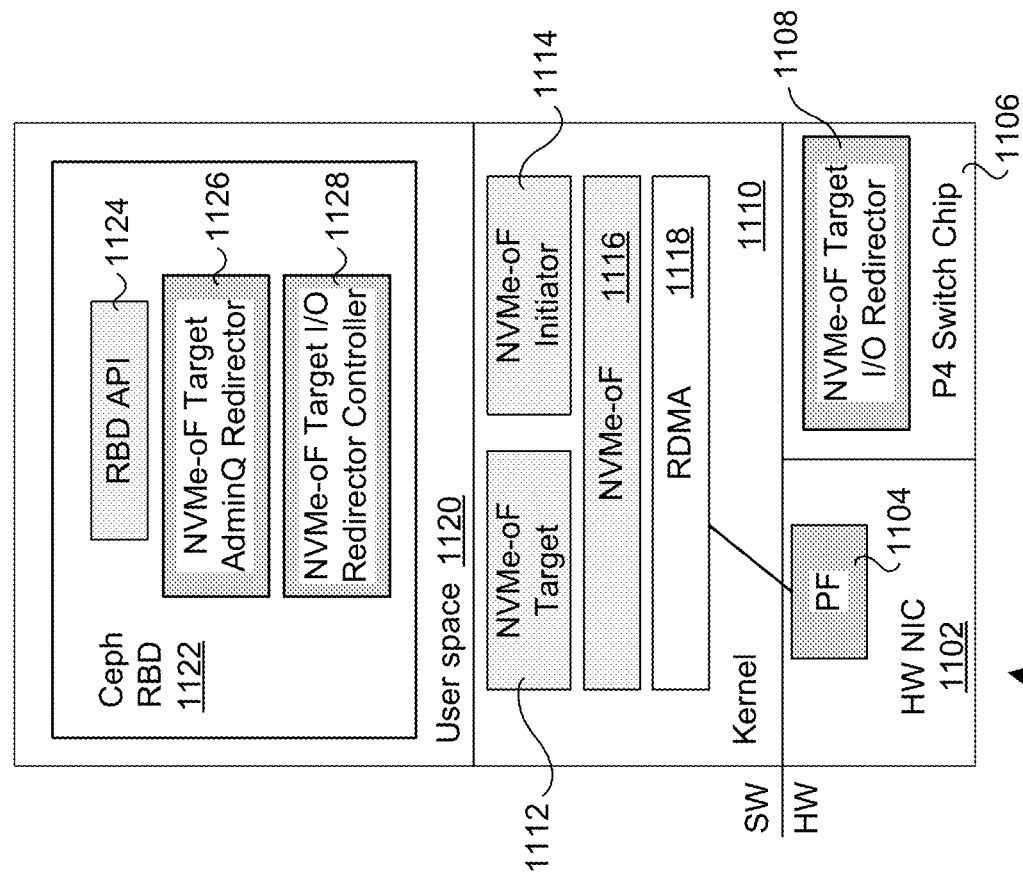
FIG. 11 is a schematic diagram of a compute ToR switch, according to one embodiment.

FIG. 11 shows a compute ToR switch 1100, according to one embodiment. The components in the hardware layer comprise a NIC 1102 including a PF 1104 and a P4 switch chip 1106 programmed to implement a NVMe-oF target I/O redirector function 1108. The software components comprise an OS kernel 1110 including a NVMe-oF target module 1112, an NVMe-oF initiator module 1114, an NVMe-oF module 1116 and an RDMA module 1118. The software components in user space 1120 comprise a Ceph RBD module 1122 including an RBD API 1124, an NVMe-oF target adminQ redirector 1126 and an NVMe-oF target I/O redirector controller 1128.

Figure 12:
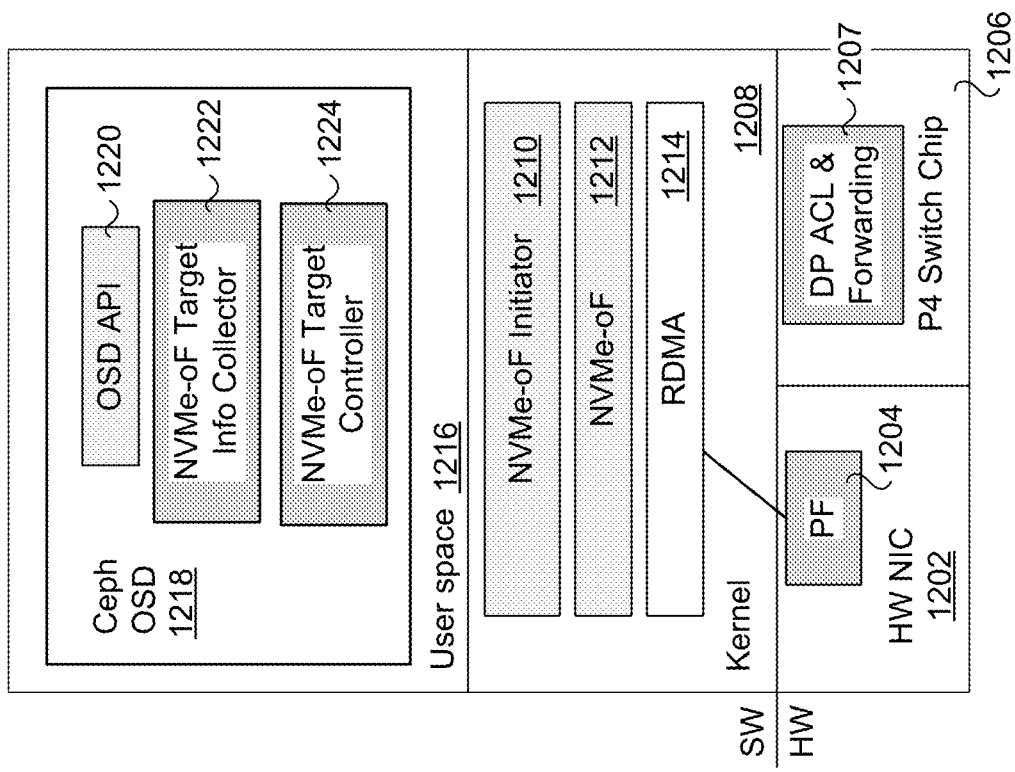
FIG. 12 is a schematic diagram of a storage ToR switch, according to one embodiment.

FIG. 12 shows a storage ToR switch 1200, according to one embodiment. The components in the hardware layer comprise a NIC 1202 including a PF 1204 and a P4 switch chip 1206 implementing data plane ACL and forwarding 1207. The software components comprise an OS kernel 1208 including a NVMe-oF NVMe-oF initiator module 1210, an NVMe-oF module 1212 and an RDMA module 1214. The software components in user space 1216 comprise a Ceph OSD module 1218 including an OSD API 1220, an NVMe-oF target information collector 1222, and an NVMe-oF target controller 1224.

In addition to implementing NVMe-oF modules in software (e.g., in the kernel), similar functionality may be implemented through use of embedded hardware components on a NIC. Examples of this configuration are illustrated by a compute ToR switch 1100a and storage ToR switch 1200a in FIGS. 11a and 12a. Generally, components and modules with the same reference numbers in compute ToR switches 1100 and 1100a are similar and perform similar functions. Likewise, components and modules with the same reference numbers in storage ToR switches 1200 and 1200a are similar and perform similar function. Accordingly, the following discusses the differences between the configurations.

Under compute ToR switch 1100a, the software-based functionality of NVMe-oF target module 1112, NVMe-oF initiator module 1114, and NVMe-oF module 1116 of compute ToR switch 1100 have been moved to the hardware layer as part of NIC 1102a, as depicted by an embedded NVMe-oF target component 1112a, an embedded NVMe-oF initiator component 1114a, and an embedded NVMe-oF component 1116a. The hardware layer further includes an embedded RDMA component 1118a. The RDMA module 1118 of compute ToR switch 1100 has been replaced by an RDMA module 1118b.

Under storage ToR switch 1200a, NVMe-oF initiator module 1210, and NVMe-oF module 1212 of storage ToR switch 1200 have been moved to the hardware layer as part of NIC 1202a, as depicted by an embedded NVMe-oF initiator component 1210a and an embedded NVMe-oF component 1212a. The hardware layer further includes an embedded RDMA component 1214a. The RDMA module 1214 of storage ToR switch 1200 has been replaced by an RDMA module 1214b. Generally, In one embodiment, the combination of RDMA module 1118b and embedded RDMA component 1118a perform similar functionality to RDMA module 1118 of compute ToR switch 1100. For example, the software component (RDMA module 1118b) can manage the overall RDMA process by setting up RDMA queue PAIRs, completion queue and performance bookkeeping function, with the hardware component (RDMA component 1118a) accessing the RDMA queues using DMA accesses. Similarly, in one embodiment the combination of RDMA module 1214b and embedded RDMA component 1214a perform similar functionality to RDMA module 1214 of storage ToR switch 1200.

In some embodiments, NICs having extended NVMe-oF and RDMA functionality similar to NIC 1202a. For example, NIC 1202a may be used for NIC 616 in storage array 612 of FIGS. 6a and 6c.

The terminology "storage array" is used in the generic sense herein, where a storage array is representative of any type of device containing storage resources that is contained in a rack or in a chassis, drawer, sled, etc., that is separate from the compute server(s)/compute nodes used to access the storage array's storage resources. For example, in disaggregated architectures such as Intel® Rack Scale Design, a storage array may be referred to as a pooled storage drawer. Generally, a difference between a storage server and a storage array is the storage server will include a CPU and be running an operating system (executed on the CPU) that includes software components to facilitate storage operations. A storage array may or may not have a CPU and may run embedded software (e.g., on an embedded processor) or use other forms of embedded logic such as FPGAs and other programmable or pre-programmed logic devices.

Another aspect of the architectures described and illustrated herein is support for multi-tenant cloud environments. Under such environments, multiple tenants that lease infrastructure from CSPs and the like are allocated resources that may be shared, such as compute and storage resources. Another shared resource is the ToR switches and/or other server switches. Under virtualized network architectures, different tenants are allocated separate virtualized resources comprising physical resources that may be shared. However, for security and performance reasons (among others), various mechanisms are implemented to ensure that a given tenants data and virtual resources are isolated and protected from other tenants in multi-tenant cloud environments.

Figure 1A:
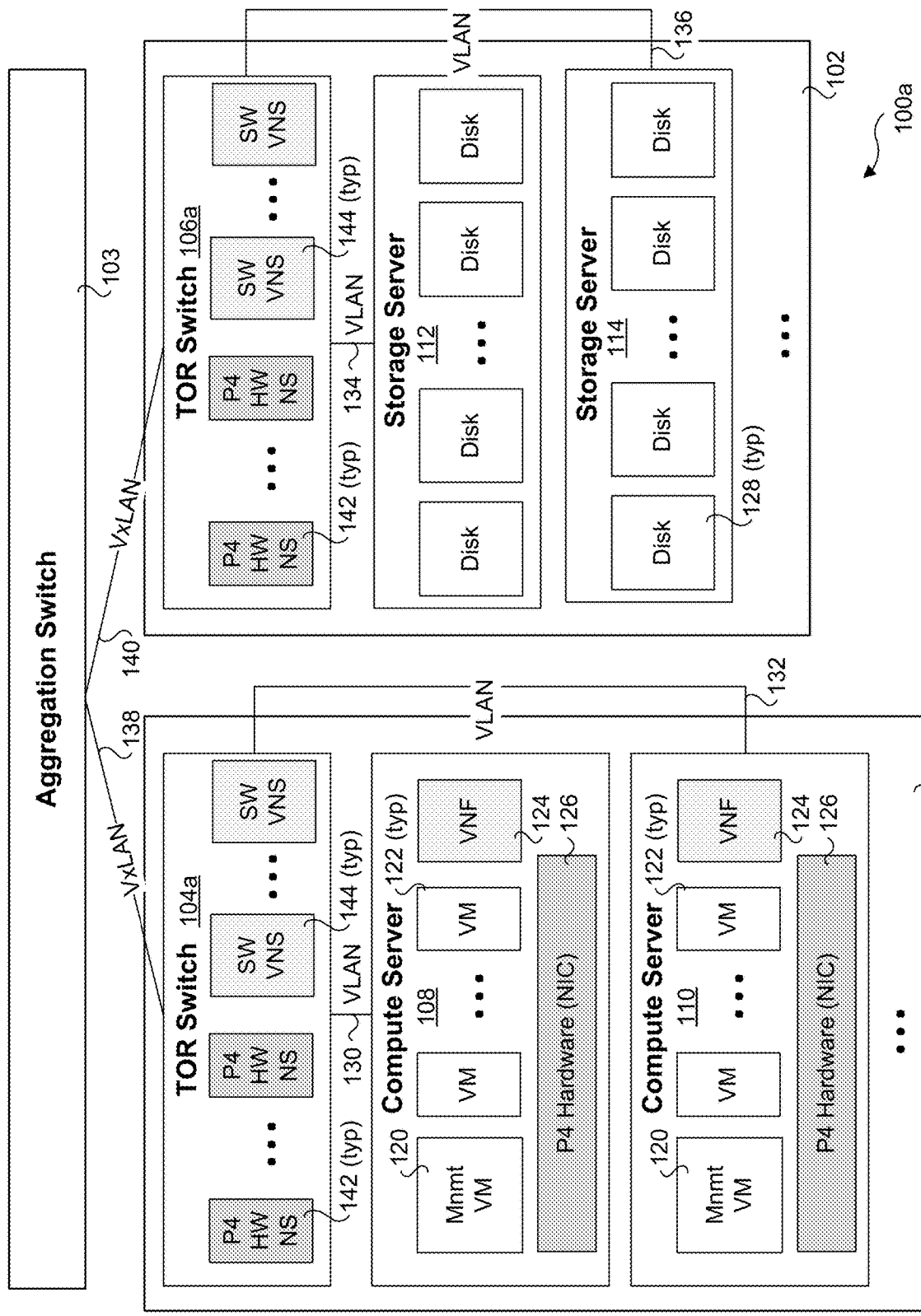
FIG. 1a is a schematic diagram illustrating an augmented version of the smart switch centered next generation cloud infrastructure of FIG. 1 to support multiple tenants.

FIG. 1a shows an architecture 100a that is an augmented version of architecture 100 in FIG. 1 that supports multi-tenant cloud environments. As depicted by like reference numbers in FIGS. 1 and 1a, the configurations of the compute servers 108 and 110 and the storage servers 112 and 114 are the same, observing that a given compute server may be assigned to a tenant or the same compute server may have virtualized physical compute resources that are allocated to more than one tenant. For example, different VMs may be allocated to different tenants.

The support for the multi-tenant cloud environment is provided in ToR switches 104a and 106a. As shown, the P4 hardware-based resources and the software-based VNFs and control plane resources are partitioned into multiple "slices," with a given slice allocated for a respective tenant. The P4 hardware-based slices are depicted as P4 hardware network slices (P4 HW NS) 142 and software-based slices are depicted as software virtual network slices (SW VNS) 144.

In a manner similar to described in the foregoing embodiments, P4 HW NS 142 are used to implement fast-path hardware-based forwarding. SW VNS 144 are used to implement control plane operations including control path and exception path operations such as connection tracking, and ACL. For the perspective of the P4 data plane runtime code, the operation of a server switch is similar whether it is being used for a single tenant or for multiple tenants. However, the ACL and other forwarding table information will be partitioned to separate the traffic flows for individual tenants. The ACL and forwarding table information is managed by the SW VNS 144 for the tenant.

Figure 1B:
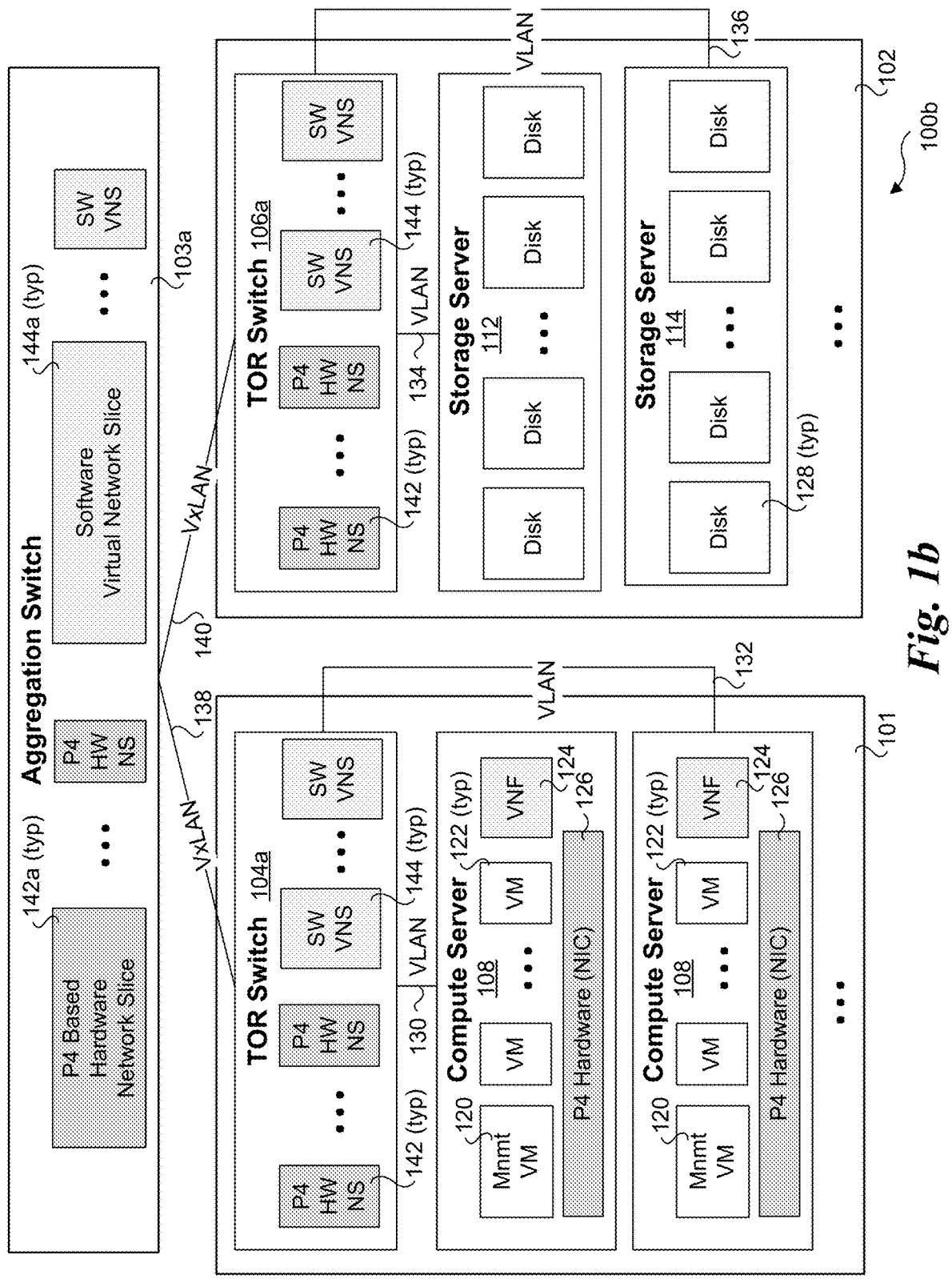
FIG. 1b is a schematic diagram illustrating an augmented version of the smart switch centered next generation cloud infrastructure of FIG. 1a to support multiple tenants adding further hardware and software components in an aggregation switch.

As shown in an architecture 100*b* in FIG. 1*b*, support for multi-tenant environments may be extended to employing P4 HW NS 142*a* and SW VNS 144*a* in an aggregation switch 103*a*. In one embodiment, P4 HW NS 142*a* is similar to P4 HW NS 142, except that P4 HW NS 142*a* is configured to forward VxLAN traffic in the data plane. Likewise, SW VNS 144*a* is configured to perform control plane operations to support forwarding of VxLAN traffic.

Extended Use Cases

Extend this Innovation to other Distributed Storage System

While the foregoing embodiments disclose use of Ceph as the example of Distributed Storage System, the principles and teachings disclosed herein may be applied to other DSS designs. Whenever the controller plane (like Ceph Manager and Monitor and parts of the RBD and OSD) could be separated from data plane, the solutions provided herein could replace the original low performance data plane with the high performance, end-to-end hardware offloading data plane.

In some of the foregoing embodiments, modified RBD and OSD modules are implemented in server switches that including one or more CPUs and a programmable switch chip inside. Optionally, similar components and functionality may be extended to usage in so-called "Smart" NICs. In this case, some of the software functionality will be implemented in embedded hardware on the Smart NIC (e.g., execution of firmware instructions on an embedded processor and/or using programmed logic the use of an ASIC or FPGA.

In addition to NVMe-oF, the teachings and principles may be extended to other fabrics and protocols. For example, Habana Labs' AI chip Gaudi uses RDMA to store information to outside. The teachings and principles disclosed herein could apply to enable Gaudi to store information to a distributed system by replacing the NVMe-oF initiator offloading to Gaudi RDMA and NVMe-oF target offloading to corresponding Gaudi RDMA target, and reprogramming the P4 program for Gaudi RDMA connection mapping and forwarding.

In the foregoing examples, VMs are used for virtual compute hosts. However, this is merely exemplary and non-limiting as other types of virtualized compute hosts and virtualization architectures may be employed. For example, the architectures may employ Type-1 or Type-2 hypervisors and container-based virtualization, such as but not limited to using Docker® containers. As used herein, including the claims, a virtual compute host includes VMs and virtualized containers.

The use of Ceph in the embodiments herein is merely exemplary and non-limiting. Other software storage platforms and associated software components may be used to perform control plane operations associated with forwarding storage traffic via the hardware offloaded data plane. The use of P4 switch chips is also exemplary and non-limiting, as other programmable switch chips may be used in a similar manner.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a distributed environment including one or more compute servers in a first rack and one or more storage servers or storage arrays in a second rack, comprising:
   receiving, at a first switch, a storage access request originating from a compute server to access a logical storage unit residing on a target storage device in a storage server or storage array;
   determining, at the first switch, the target storage device; and
   forwarding the storage access request via a forwarding path traversing the first switch to the target storage device;
   wherein:
   the first switch comprises a processor to execute software that is to receive write data from an application associated with the compute server;
   execution of the software by the processor is to result in distributed replicating of the data in the one or more storage servers or storage arrays; and
   the first switch also comprises programmable hardware to detect failure of the target storage device and to notify the software of the failure.

2. The method of claim 1, wherein the forwarding path is implemented in a data plane offloaded to hardware.

3. The method of claim 2, wherein the compute server is connected to the first switch via a second link, the first switch is connected to a second switch via a second link, and the second switch is connected to the storage server or storage array via a third link, and wherein the forwarding path in the data plane offloaded to hardware traverses the first link, the first switch, the second link, the second switch, and the third link.

4. The method of claim 1, wherein the first switch comprises a server switch including hardware comprising a switch chip and one or more processors coupled to memory in which software components are executed, the switch chip programmed to implement hardware-based data plane operations.

5. The method of claim 4, wherein the switch chip comprises a programmable switch chip that is programmed using the P4 programming language.

6. The method of claim 4, wherein the software components include software modules configured to implement control plane operations in connection with the offloaded hardware data plane.

7. The method of claim 4, wherein:
   the first switch comprises a Ceph RBD (Reliable Autonomic Distributed Object Store (RADOS) Block Device) module; and
   the Ceph RBD module is to be executed on the processor in the first switch.

8. The method of claim 1, wherein the data transfers between the compute server and the storage server or storage array are facilitated using an NVMe-oF (Non-volatile Memory Express over Fabric) protocol.

9. The method of claim 8, wherein the data transfers between the compute server and the storage server or storage array are facilitated using a Remote Direct Memory Access (RDMA) protocol in combination with the NVMe-oF protocol.

10. The method of claim 1, wherein the logical storage unit comprises one of a storage object, storage block or file.

11. A system, comprising:
   a compute server, installed in a first rack, including memory connected to one or more processors on which software components are executed including an operating system and software executing in a user space including a first virtual compute host;
   a storage server or storage array, including a plurality of storage devices, installed in a second rack;
   a compute Top of Rack (ToR) switch installed in the first rack, communicatively coupled to the compute server and including one or more processors on which software instructions are executed for implementing control plane operations and including hardware configured to support data plane forwarding operations; and
   a storage Top of Rack (ToR) switch installed in the second rack, communicatively coupled with the compute ToR switch and the storage server or storage array, including one or more processors on which software instructions are executed for implementing control plane operations and including hardware configured to support data plane forwarding operations, wherein the system is configured to enable the first virtual compute host to access one or more of the plurality of storage devices in the storage server or storage array using an end-to-end data plane offloaded to hardware; and also wherein:
the one or more processors of the compute ToR switch are to execute other software that is to receive write data from an application associated with the compute server;
execution of the other software by the one or more processors of the compute ToR switch is to result in distributed replicating of the data in the storage server or storage array; and
the compute ToR switch also comprises programmable hardware to detect failure of a target storage device and to notify the other software of the failure.

12. The system of claim 11, wherein each of the compute ToR switch and the storage ToR switch comprises a server switch including hardware comprising a hardware-programmable switch chip programmed to implement hardware-based data plane forwarding operations.

13. The system of claim 11, wherein the software components are configured to implement control plane operations in connection with the offloaded hardware data plane operations to support end-to-end data transfers between the first virtual compute host and the one or more of the plurality of storage devices.

14. The system of claim 13, wherein:
the compute ToR switch includes and executes, at least in part, a Ceph RBD (Reliable Autonomic Distributed Object Store (RADOS) Block Device) module; and
the storage ToR switch includes and executes, at least in part, a Ceph Object Storage Daemon (OSD) module.

15. The system of claim 11, wherein the data transfers between the first virtual compute host and the one or more of the plurality of storage devices employ a NVMe-oF (Non-volatile Memory Express over Fabric) protocol.

16. A server switch, comprising:
a network interface controller (NIC);
a first central processing unit (CPU);
memory coupled to the first CPU, having an address space logically partitioned to include a kernel space and a user space; and a programmable switch chip, operatively coupled to the first CPU, the memory, and the NIC,
wherein the programmable switch chip is programmed using a hardware programming language to implement hardware-based data plane operations under which packets associated with storage traffic originating from or destined to virtual compute hosts running on one or more compute servers are forwarded via hardware-based data plane operations implemented in the programmable switch chip when the one or more compute servers are communicatively coupled to the NIC either directly or via a second server switch; and also wherein:
the programmable switch chip is to execute software that is to receive write data from an application associated with the one or more compute servers;
execution of the software by the programmable switch chip is to result in distributed replicating of the data in a storage server or storage array; and
the programmable switch chip comprises hardware to detect failure of a target storage device and to notify the software of the failure.

17. The server switch of claim 16, further comprising user space software implementing control plane operations that are performed in connection with forwarding the storage traffic originating from the virtual compute hosts running on the one or more compute servers.

18. The server switch of claim 16, further comprising a compute Top of Rack (ToR) switch configured to be communicatively coupled to the one or more compute servers, and also further comprising Ceph RBD (Reliable Autonomic Distributed Object Store (RADOS) Block Device) module configured to be executed in the user space of the address space of the memory coupled to the first CPU.

19. The server switch of claim 16, wherein the second server switch comprises a storage Top of Rack (ToR) switch configured to be communicatively coupled to the one or more storage servers or to one or more storage arrays, and also further comprising a Ceph Object Storage Daemon (OSD) module configured to be executed by the second server switch.

20. The server switch of claim 16, wherein the storage traffic comprising Non-Volatile Memory Express over Fabric (NVMe-oF) traffic.

* * * * *